July 19, 1927. 1,636,272
W. J. B. ALDRIDGE
TRAFFIC SIGNAL
Filed Jan. 25, 1923
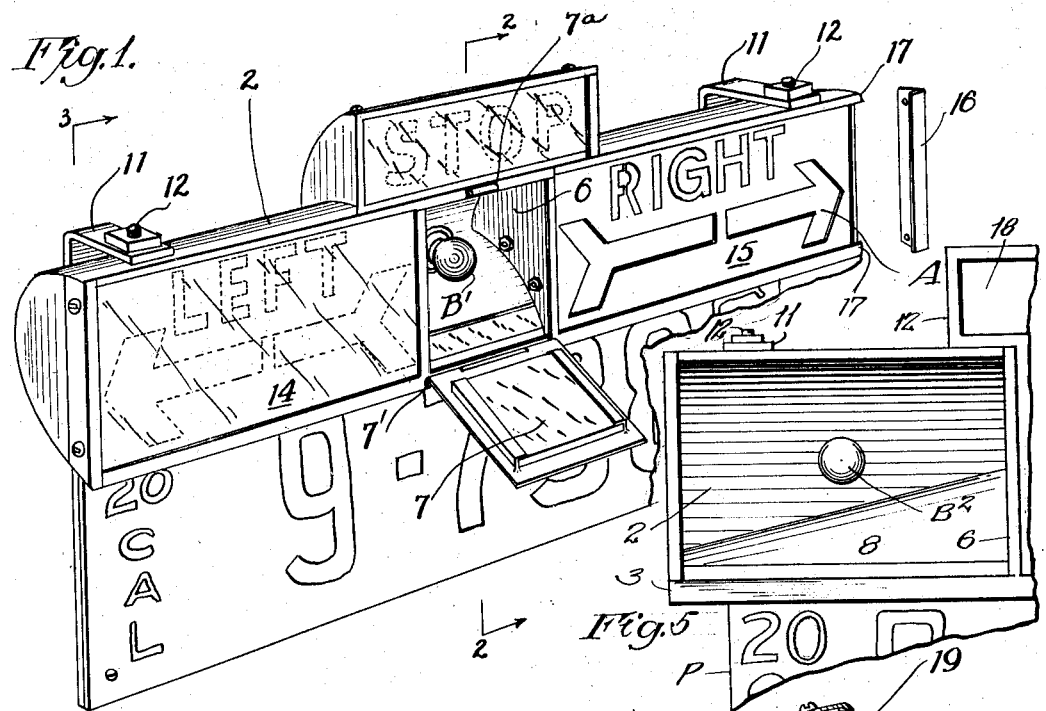
Fig.1.
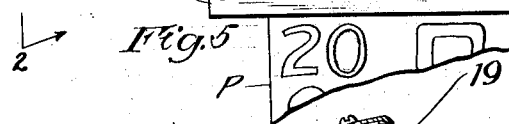
Fig.5.
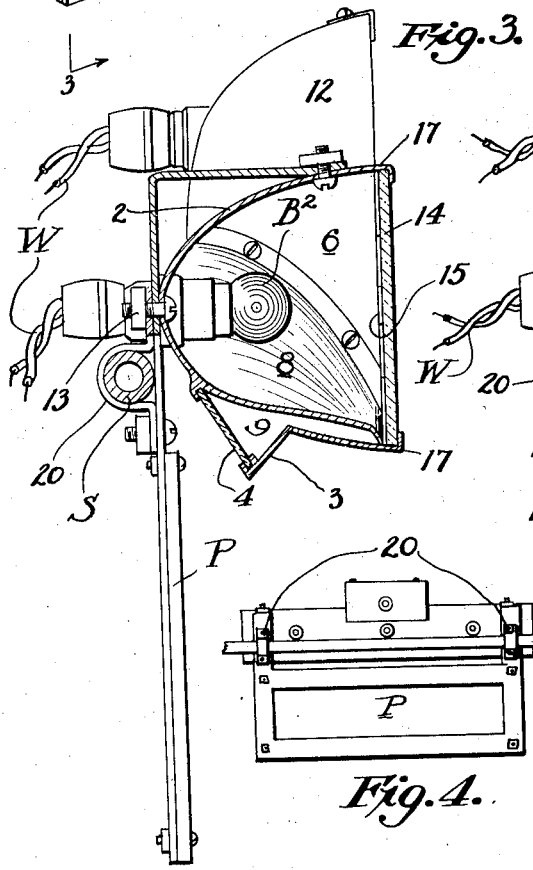
Fig.3.
Fig.4.
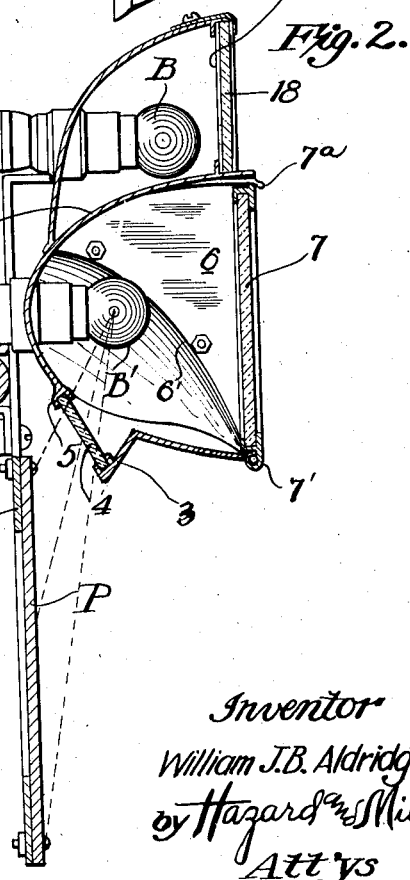
Fig.2.
Inventor
William J.B. Aldridge
by Hazard and Miller
Att'ys Patented July 19, 1927.

1,636,272

UNITED STATES PATENT OFFICE.

WILLIAM J. B. ALDRIDGE, OF PASADENA, CALIFORNIA.

TRAFFIC SIGNAL.

Application filed January 25, 1923. Serial No. 614,759.

This invention relates to signal apparatus and especially to signal devices for traffic vehicles.

It is an object of the present invention, to provide a signal device consisting of a shell having a plurality of independent chambers each with an independent signal lamp or bulb, whereby an effective signal may be given as to an intended mode of operation or stopping of a vehicle. Another object of the invention is to provide a signal device having means for convenient attachment of a license plate, the device having an elongated chamber with a comparatively small tail light window, the elongated chamber having a window for the effective passage of rays of light to the attached license plate. Another object of the invention is to provide a shell having compartments for signals indicating a right-hand turn and a left-hand turn and also for indicating stop, the whole forming a compact, substantial and practical construction and organization adapted to be readily attached to either the front or rear end, or other suitable locations upon a road vehicle.

Other objects and advantages will be made manifest in the following specification of an embodiment of the invention illustrated in the accompanying drawings, wherein Figure 1 is a perspective of the improved signal showing the tail light window opened to disclose interior construction of the tail light chamber and also indicating a removed end clamp member forming a part of the shell.

Fig. 2 is a vertical section on line 2—2, Fig. 1, from front to rear of the central portion of the signal.

Fig. 3 is a section on a vertical line 3—3 of Fig. 1.

Fig. 4 is a rear elevation, on a somewhat smaller scale, showing the attachment of the signal to a supporting rod.

Fig. 5 is a partial elevation broken away, showing the interior of the device having the left hand signal.

The invention, as shown, consists of a generally elongated housing or shell 2 preferably having a parabolic cross section from front to rear for efficiently reflecting forwardly light rays from suitable sources of light, such as electric bulbs B arranged in separate chambers hereinafter described.

Substantially throughout the length of the bottom of the shell 2 there is a downwardly extending flange 3 supporting the lower edge of a clear transparent window 4, which is inclined upwardly and rearwardly and is supported in a seat 5 provided along the bottom of the shell 2. This window 4 provides for the downward reflection and passage of light rays from a bulb B' which is disposed in an intermediate or central chamber having side walls 6 extending from front to rear in the shell; the front of this chamber being provided with a preferably red colored window 7 forming the tail light of the device when the bulb B' is energized. The partition walls 6—6 are cut away at their lower and rear edges as on the line 6', and from this cut away edge there extends toward each end of the shell 2 an intermediate partition 8 forming tunnel-like passageways 9 into which light may pass endwise from the tail light chamber, and thence downwardly through the window 4 to enable the distribution of the light rays from the tail light bulb B' onto a license plate P which is supported by attachment to a suitable frame 10 having upwardly extending end brackets 11 bolted or otherwise secured as at 12 to the top of the shell 2 and also bolted as at 13 to the back of the shell. The window 4 is some distance back of the plane of the license plate and is at an angle of about 45 degrees relative to the license plate, so as to well illuminate the plate.

On opposite sides of the tail light chamber and extending from the side walls 6 thereof are end chambers each of which is provided with a signal indicating window, one of which is designated as "Right" and the other as "Left", and for further enhancing the effectiveness of the word signals, the windows may be provided with arrows A thus showing graphically intended direction of turn. In the elongated chambers designated "Right" and "Left" are respective lamp bulbs B² which are selectively energized by the closure of a proper circuit, the wires of which are indicated at W, Fig. 3. The right and left signal devices may be of any suitable form of construction and may consist of colored glass or other transparent plates 14 behind which may be placed opaque and stenciled sign elements 15. The sign elements and windows may be readily inserted and removed for interchange or for renewal by the removal of an end flange or piece 16, Fig. 1, closing the channels 17 provided in the top and bottom edges of the shell 2.

The signal shell includes also a compartment or chamber in which is located the bulb B, Fig. 2, and which chamber is provided with a window 18 behind which is a stenciled opaque sign member 19 for disclosing the word "Stop", Fig. 1, when the bulb B is energized by closing the respective circuit thereof.

To provide for the ready attachment of the signal to any appropriate support, as for instance a transverse rod or supporting element S, simple U-clamps 20 are attachable to the frame 10 and are adapted to be set tight around the supporting member S.

From the above it will be seen that I have provided a signal device of simple and substantial and practical construction and which is provided with separate chambers adapted to be independently illuminated to give the desired signal, and one of which chambers, constituting the tail light signal chamber, is provided so that the rays of the lamp therein can be directed to substantially the full length of the legal license plate so long as the tail light is energized.

The window 7 of the tail light is shown as hingedly mounted at 7' to be readily opened and closed, and a latch 7ᵃ is provided for retaining the window 7 in closed position.

Further embodiments, modifications and variations may be resorted to within the spirit of the invention as herein claimed.

What is claimed is:

1. A traffic signal comprising an elongated shell of substantially parabolic cross section, forming a reflector, said shell having extreme ends at right angles to the axis of the shell, an electric lamp in the central portion of the reflector, a wall on each side of the central lamp cut away at their lower and rear edges, an intermediate partition extending from the lower edge of said walls on a downward inclination to the opposite square ends of the reflector, said partitions being inclined backwardly and downwardly, a window placed in the lower side of the reflector below the partitions, and extending the full length of the shell so that the direct and reflected rays of light from the central lamp will pass through said window and illuminate the license plate.

2. A traffic signal as claimed in claim 1, having a lens indicating a danger signal in front of the central lamp, a right and left lens at the respective ends of the traffic signal and a lamp positioned in the shell extending through the reflector above the said partitions.

In testimony whereof I have signed my name to this specification.

WILLIAM J. B. ALDRIDGE.